United States Patent
Encrenaz et al.

(10) Patent No.: US 10,200,568 B2
(45) Date of Patent: Feb. 5, 2019

(54) PIXEL PROCESSING

(71) Applicant: HEWLETT-PACKARD DEVELOPMENT COMPANY, L.P., Houston, TX (US)

(72) Inventors: Michel Georges Encrenaz, Rubi (ES); Peter Morovic, San Cugat del Valles (ES); Johan Maurice Lammens, Sant Cugat del Valles (ES); Jan Morovic, Colchester (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/521,842

(22) PCT Filed: Nov. 3, 2014

(86) PCT No.: PCT/EP2014/073590
§ 371 (c)(1),
(2) Date: Apr. 25, 2017

(87) PCT Pub. No.: WO2016/070902
PCT Pub. Date: May 12, 2016

(65) Prior Publication Data
US 2017/0257527 A1    Sep. 7, 2017

(51) Int. Cl.
*H04N 1/52* (2006.01)
*H04N 1/60* (2006.01)
*B41J 2/21* (2006.01)

(52) U.S. Cl.
CPC .............. *H04N 1/52* (2013.01); *B41J 2/2103* (2013.01); *H04N 1/6022* (2013.01)

(58) Field of Classification Search
CPC .................................. H04N 1/52; B41J 2/2103
See application file for complete search history.

(56) References Cited

U.S. PATENT DOCUMENTS

| | | | |
|---|---|---|---|
| 6,057,932 A * | 5/2000 | Yoshida | H04N 1/52 358/1.9 |
| 7,075,643 B2 | 7/2006 | Holub et al. | |
| 8,213,055 B2 | 7/2012 | Morovic | |

(Continued)

FOREIGN PATENT DOCUMENTS

| | | |
|---|---|---|
| EP | 0580376 | 1/1994 |
| EP | 0768792 | 4/1997 |

(Continued)

OTHER PUBLICATIONS

Morovic, et al. HANS: Controlling Ink-Jet Print Attributes Via Neugebauer Primary Area Coverages. Feb. 2012.

(Continued)

*Primary Examiner* — Bradley Thies
(74) *Attorney, Agent, or Firm* — HP Inc. Patent Department

(57) ABSTRACT

Described herein are systems and methods for processing an image such as a halftone image. For example, in some embodiments, pixels of an image are checked to see if when printed would be represented by a given output. Pixels of the image that match defined values are replaced with pixels that are represented by a different set of outputs. This latter set of outputs may be selected to optimize one or more imaging attributes.

14 Claims, 2 Drawing Sheets

(56) References Cited

U.S. PATENT DOCUMENTS

| 8,345,310 B2 | 1/2013 | Adachi et al. |
| 2011/0096364 A1 | 4/2011 | Morovic et al. |
| 2014/0016143 A1 | 1/2014 | Morovic et al. |

FOREIGN PATENT DOCUMENTS

| EP | 1940146 | | 2/2008 |
| JP | 2012109871 | | 6/2012 |
| JP | 2012109871 A | * | 6/2012 |

OTHER PUBLICATIONS

Klassen et al: "Reducing Ink Coverage Levels in Binary CMYK Images", IS&T's 46th Annual Conference, Jan. 1, 1993, pp. 173-175.

* cited by examiner

PIXEL PROCESSING

BACKGROUND

Imaging systems are arranged to output an image. They may comprise printing or display systems, wherein an output is either a printed or displayed image. In these cases, color data for the image may be represented in a first color space and it may be necessary to map this color data to a second color space that is used to produce the output. To do this a color mapping may be used. In a halftone imaging system, the color mapping may be followed by a halftoning process so as to reproduce a continuous tone image represented in the second color space using a series of dot shapes. This may allow the continuous tone image to be printed on a printing device with a discrete number of output drop levels. The result of this process is an output in the form of a halftone color separation.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to systems and methods for processing pixels in an image. These examples may be used to modify ink usage in a printer. More particularly, certain examples relate to systems and methods for replacing data values of pixels in a halftone image. This may help to minimize the ink usage of a printer. In certain examples pixels that result from a halftoning process are substituted if they match a particular pattern. This pattern may be defined in an associative array such as a dictionary. Substituted pixels may be selected to have improved properties, such as optimized properties with regard to one or more imaging attributes or metrics.

Figure 1:
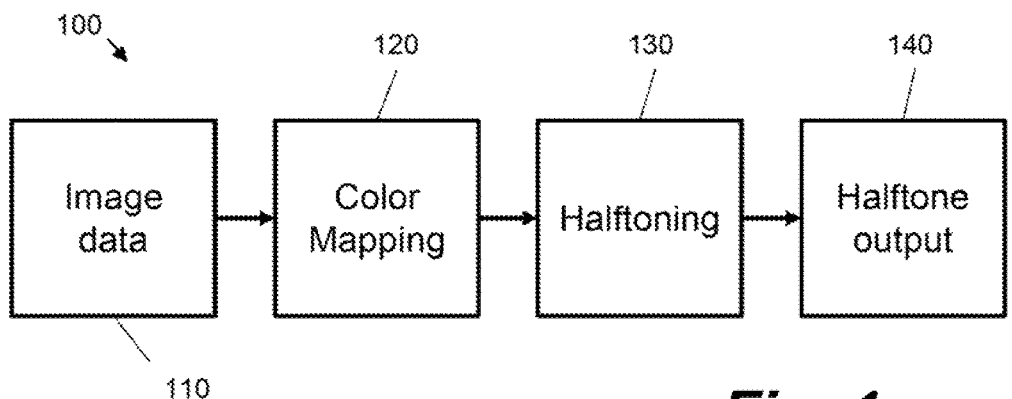
FIG. 1 is a schematic diagram of an image processing pipeline according to an example.

FIG. 1 shows an example of an image processing pipeline 100. Certain examples described herein modify an output of the image processing pipeline 100. This modification may be performed to optimize use of a print material, e.g. to reduce ink usage. In the example of FIG. 1, image data 110 is passed into a color mapping component 120. The image data 110 may comprise color data as represented in a first color space, such as pixel representations in an RGB color space. The color mapping component 120 maps the color data from the first color space to a second color space. In the present example, color mapping component 120 maps color data from a first color space to a colorant color space so as to generate a color separation. For example, the colorant color space may be a colorant color space and the color separation may comprise a set of colorant vectors, e.g. each RGB pixel value may be mapped to a Cyan, Magenta, Yellow and blacK (CMYK) pixel value, wherein the CMYK pixel value denotes a proportion of colorant (e.g. [10, 125, 80] may be mapped to [0.92, 0.0, 0.36, 0.51]). The proportion of each colorant may be represented by a fraction (e.g. 0 to 1) or a percentage (e.g. 0 to 100%). The colorants used within the colorant space may vary depending on a desired printing device, e.g. six colorants may be used in association with a CMYKcm printing device.

The color separation generated by the color mapping component 120 comprises continuous tone data, i.e. each colorant is denoted using a continuous range. In the context of the first image processing pipeline 100, the term "color separation" refers to the output of a color mapping in a colorant space. In certain cases, a color separation may comprise multiple colorant images or components, e.g. one for each colorant in a printing system. For ease of explanation, the term "color separation" will be used herein to refer to the result of combining each of the multiple colorant components, rather than each of the colorant components themselves.

In the first image processing pipeline 100, following generation of a color separation, a halftoning component 130 applies a halftoning operation to the continuous tone data to generate a halftone output 140. The halftoning operation uses a series of geometric shapes to convert the continuous tone data of the color separation to a discrete tone data, e.g. data comprising a discrete number of color levels. For example, if an image is to be printed on a binary level printing device (e.g. with either 0% or 100% colorant per pixel) then a halftoning component 130 may generate a halftone output with two discrete tone levels per colorant. Typically, a series of dots are used to replicate the continuous tone data, wherein each dot comprises a solid color and a variation in one or more of dot size, dot shape and dot spacing simulates a continuous tone when viewed from a distance. The halftone output may be referred to herein as a halftone image.

In other examples, different image processing pipelines may be used to generate a halftone image. For example, a Halftone Area Neugebauer Separation (HANS) pipeline may be used to generate a halftone image by mapping color data in a first color space to an area coverage representation such as a Neugebauer Primary area coverage (NPac) vector in NPac color space. This area coverage representation may be used to specify the spatial distribution of colorants in a halftoning operation. For example in a HANS pipeline, a halftone image on a substrate comprises a plurality of pixels or dots wherein the spatial density of the pixels or dots is defined in NPac color space and NPac vectors for a set of pixels controls the colorimetry of an area of the image, i.e. any halftoning process simply implements the area coverages as defined in the NPac vectors.

An image represented by pixels as generated by the image processing pipelines discussed above can be printed on a substrate using drops or dots of ink to represent each pixel. In some examples, a pixel may be printed on the substrate by printing multiple dots of ink in a particular area of the substrate to represent the pixel, e.g. this may the case for a k-level printer that is capable of depositing k drops of ink as dots in a pixel area of a substrate. It may be advantageous to modify such images in a manner to have improved ink usage when printing the image, while at the same time not requiring a significant amount of processing power to make such modifications to the image.

Certain examples described herein modify images, including halftone images and/or images represented by NPac vectors. In particular, certain embodiments allow for replacing pixel data values in an image to improve one or more image properties such as ink usage when the image is printed. In some embodiments, this may be advantageous to reduce the amount of ink needed and/or reduce the use of expensive color ink, e.g. as opposed to cheaper black ink, when printing an image. Alternatively, the image properties may relate to color robustness, color constancy, banding etc. For example, methods and systems of parsing/checking portions (e.g. pixels or other image area definitions) of a digital representation (e.g. image file, JPEG, GIF, etc.) of an image and replacing those portions are described herein. The methods and systems might comprise a dedicated apparatus and/or be implemented as a computer program (e.g. a script in a programming language) running on a computer, or other software and/or hardware.

Figure 2:
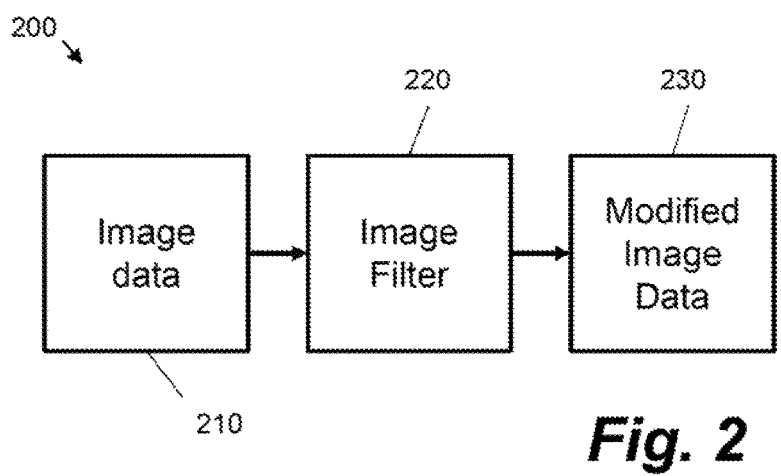
FIG. 2 is a schematic diagram of an apparatus for processing a halftone image according to an example.

FIG. 2 shows an example of an apparatus 200 for processing a halftone image, such as the halftone images generated by the image processing pipelines that are discussed above. The apparatus 200 receives image data 210 representative of the halftone image. This image data 210 is then accessed by an image filter 220. The image filter 220 processes the image data 210 and generates modified image data 230 representative of a replacement halftone image.

The image filter 220 is arranged to identify pixels in the image data 210 for the halftone image that match a pre-defined pattern. This pattern may be represented by a set of data values that are stored in an associative array, i.e. a data structure that comprises one or more key-value pairs. In this case, the keys of the associative array may represent a pattern value to be matched and the values of the associative array may represent replacement pixel values. For example, in one case the keys may represent pixel values that instruct a deposit of at least two units of a black print material and at least one additional unit of non-black print material. For example, in the context of an image to be printed, a unit of print material may comprise a drop of ink in an inkjet printer. The image filter 220 is arranged to process the identified pixels and to generate replacement data for said pixels in the modified image data 230 based on the pattern matching, e.g. based on the values of the key-value pairs in the array. In one case, these values may instruct a deposit of only units of black print material.

In one case, the image filter 220 is arranged to access an associative array in the form of a data dictionary comprising a plurality of entries. In this case, each entry in the dictionary may be indexed by a data value that matches the pattern, e.g. in one implementation instructs a deposit of at least two units of a black print material and at least one additional unit of non-black print material. Each entry also comprises a replacement data value for the indexed data value. In the above implementation this may instruct a deposit of only units of black print material. For example, each entry may be a tuple of the form {"[pixel data value X]": "[replacement data value for X]"}. The dictionary may be used to identify pixel values in the image data 210 that match the indexed data values. The replacement data value may then be used to replace the indexed data values in the image data 210. This may be applied as one operation. The replacement data values may be written in situ, i.e. may overwrite data values in the original image data 210, or they may be written into a new data file, i.e. a new halftone image may be generated that comprises the modified image data wherein the original image data 210 is unmodified.

Figure 3:
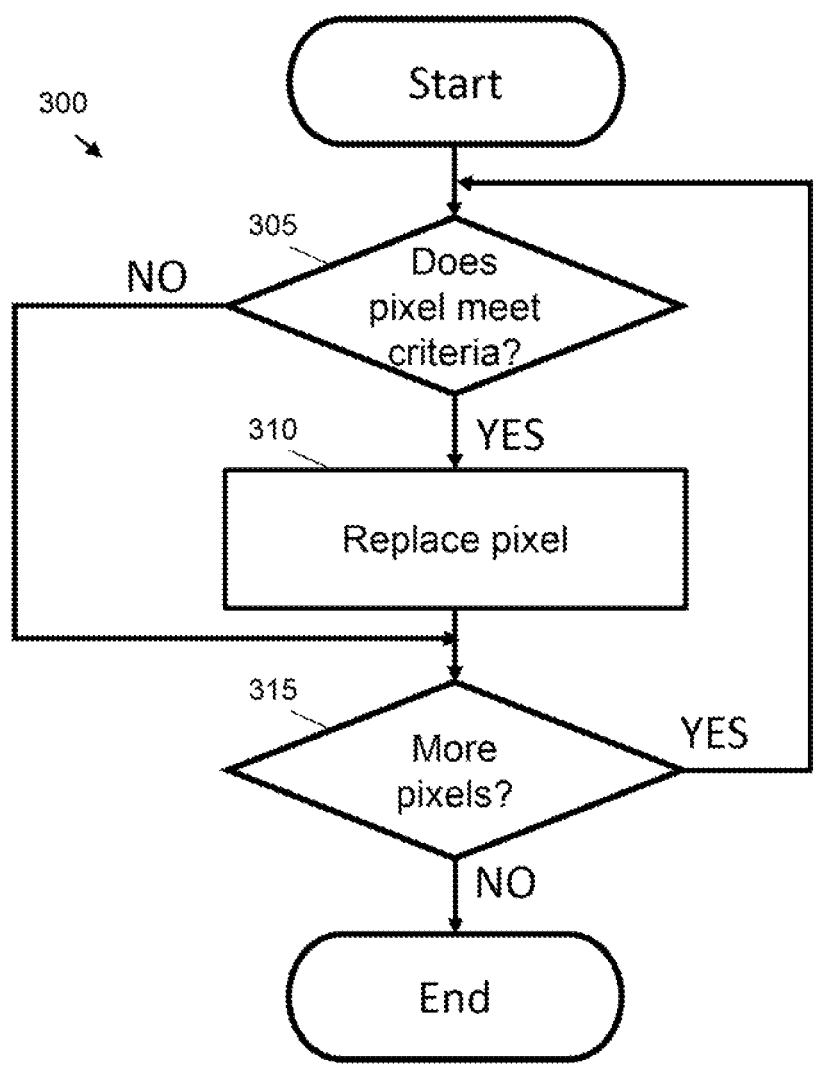
FIG. 3 is a flow chart showing a method for modifying images according to an example.

FIG. 3 shows a method 300 for modifying an image, e.g. a halftone image, by replacing individual pixels in the image according to an example. This particular example is configured to reduce ink usage; however, the functions may be extended to other image properties or attributes in other examples. For example, the method may be adapted to optimize a second set of imaging attributes with respect to a first set of imaging attributes using pixel replacement for a halftone image. It should be noted that though pixel replacement is discussed, other sub portions of the image can be replaced in a similar manner.

At a first block 305, a pixel of a digital representation of an image is checked, such as by using a computing device, to see if it meets a criteria for replacement. For example, the criteria may comprise whether the pixel when printed would be represented/printed using at least a certain number of dots of black ink. One particular embodiment would be to check if the pixel when printed would be represented/printed using at least two dots of black ink. Checking for at least two dots of black ink on a per pixel basis may be advantageous as it represents a threshold number of black dots where a number of dots of black ink below the threshold may lead to worse color representation in the image, and a greater number of dots of black ink may lead to wasted ink.

In some embodiments, the criteria check may be performed by checking whether a Neugebauer Primary (NP) value associated with the pixel comprises at least the certain number of dots of black ink. Neugebauer Primaries (NPs) comprise a particular ink overprint combination for a printing system. For example, in a binary (bi-level) printer, an NP is one of $2^m$ combinations of m inks within the printing system. For example, if a printing device uses CMY inks there can be eight NPs, these NPs relate to the following: C, M, Y, C+M, C+Y, M+Y, C+M+Y, and W (white or blank indicating an absence of ink). Other examples may also incorporate multi-level printers, e.g. where print heads are able to deposit L drop levels, in this case an NP may comprise one of $L^m$ combinations of m inks within the printing system. Although certain printing device examples are described with reference to one or more colorant levels, it should be understood that any color mappings may be extended to other printing fluids such as glosses and/or varnishes that may be deposited in a printing system and that may alter a perceived output color; these may be modelled as NPs. As such each pixel in the representation may be represented by an NP (e.g., CM, CMK, CMKK, YKK, KKK, etc.). In some embodiments, any NP that is represented by at least two black dots (i.e., contains at least two Ks) meets the criteria.

In some embodiments, the check may be performed using a lookup table (also referred to as a "filtering dictionary"). For example, for images for printing on a CMYKcm printer, where up to 4 dots of ink can be printed per pixel, and the criteria is whether an NP associated with the pixel comprises at least two dots of black ink, the lookup table might include the following NP values that meet the criteria: CKK, MKK, YKK, CCKK, MMKK, YYKK, MKKK, CKKK, YKKK, KKcc, KKmm, KKc, KKm KKcm, CMKK, CYKK, and MYKK. The check may be performed by seeing if the pixel is found in the lookup table, and if it is, it meets the criteria.

If at the block 305 it is determined that the pixel does meet the criteria, the method proceeds to a block 310. If at the block 305 it is determined that the pixel does not meet the criteria, the method 300 proceeds to a block 315.

At the block 310, the pixel in the digital representation of the image that meets the criteria is replaced with a different pixel. For example, in some embodiments where the criteria comprises whether the pixel when printed would be represented/printed using at least a certain number of dots of black ink, the pixel may be replaced with a pixel that when printed is represented by the same number of black dots as the original pixel and no dots of any other color. For instance, if the certain number of dots of black ink is 2, then a pixel represented by one or more color dots and two black dots would be replaced by a pixel represented by only two black dots, and a pixel represented by one or more color dots and three black dots would be replaced by a pixel represented by only three black dots.

In another such embodiment, the pixel may be replaced by a pixel that has a certain number of black dots (e.g., 2) and no dots of any other color. For instance, if the criteria is based on the at least a certain number of dots of black ink being 2, then a pixel represented by one or more color dots and two black dots would be replaced by a pixel represented by only two black dots, and a pixel represented by one or more color dots and three black dots would also be replaced by a pixel represented by only two black dots.

In some embodiments, replacement of the pixel may be performed by replacing an NP associated with the pixel with another NP. For example, a pixel represented by the NP CCKK, may be replaced with the NP KK.

The replacement may be performed using the above discussed lookup table. For example, each pixel included in the lookup table that meets the criteria may be paired with an associated replacement pixel. Therefore, the pixel is replaced with the associated replacement pixel per the lookup table. As discussed above the pairs may be represented as tuples of the form "pixel":"replacement pixel". Accordingly, in an embodiment for images for printing on a CMYKcm printer, where up to 4 dots of ink can be printed per pixel, and the criteria is whether an NP associated with the pixel comprises at least two dots of black ink, and the replacement is to represent the pixel using only the same number of dots of black ink, the lookup table may be represented as CKK:KK, MKK:KK, YKK:KK, CCKK:KK, MMKK:KK, YYKK:KK, MKKK:KKK, CKKK:KKK, YKKK:KKK, KKcc:KK, KKmm:KK, KKc:KK, KKm:KK, KKcm:KK, CMKK:KK, CYKK:KK, and MYKK:KK.

In another embodiment for images for printing on a CMYKcm printer, where up to 4 dots of ink can be printed per pixel, and the criteria is whether an NP associated with the pixel comprises at least two dots of black ink, and the replacement is to represent the pixel using only two dots of black ink, the lookup table may be represented as CKK:KK, MKK:KK, YKK:KK, CCKK:KK, MMKK:KK, YYKK:KK, MKKK:KK, CKKK:KK, YKKK:KK, KKcc:KK, KKmm: KK, KKc:KK, KKm:KK, KKcm:KK, CMKK:KK, CYKK: KK, and MYKK:KK.

Further, at a block 315, it is determined if there are any more pixels to check against the criteria. If it is determined there are more pixels to check, the method 300 returns to the block 305, otherwise the method ends.

The modified image may then be printed using a printer on a substrate such as paper. Such methods and systems described herein may be advantageous as they do not require much processing power to perform a simple lookup of pixels that meet a threshold number of dots of black ink, while reducing ink usage for printing the modified image.

Figure 4:
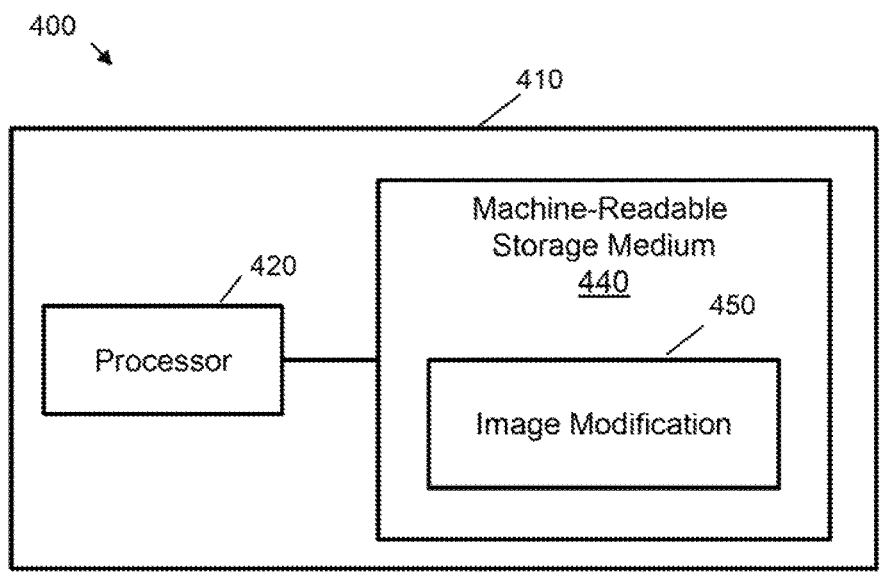
FIG. 4 is a schematic diagram showing a processing device according to an example.

Certain methods and systems as described herein may be implemented by a processor that processes computer program code that is retrieved from a non-transitory storage medium. FIG. 4 shows an example 400 of an imaging system 410 comprising a machine-readable storage medium 440 coupled to a processor 420. In certain case the imaging system 410 may comprise a computer; in other cases the imaging device may comprise a printer, scanner, display device or the like. Machine-readable media 440 can be any non-transitory media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 4, the machine-readable storage medium comprises program code to implement an image modification 450 such as the methods of image modification (e.g., method 300) and/or the apparatus (e.g. apparatus 200) described herein. Similarly, it should be understood that the apparatus 200 or method 300 may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least an image filter as described above. In this regard, the described examples may be implemented at least in part by computer program code stored in (non-transitory) memory and executable by the processor, or by hardware, or by a combination of tangibly stored code and hardware (and tangibly stored firmware).

For example, in one case the computer-readable instructions, when executed by a processing system, cause the processing system to determine whether a data value for a pixel in a plurality of pixels of a digital representation of an image instructs a printing device to deposit of at least two units of a black print material and at least one additional unit of non-black print material. Responsive to a positive determination, e.g. a determination that the data value does instruct in the manner described, the instructions cause the processing system to output a replacement data value for the pixel that instructs a printing device to deposit only units of black print material. In one case if the determination is negative, e.g. the data values does not instruct deposit in the aforementioned manner, the original data value is used for the pixel in a replacement digital representation. The replacement digital representation may be a new or modified image or data file for print. A replacement data value may be output by setting data values for color channels other than black to zero.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for processing a halftone image, the method comprising:
   checking a plurality of pixels of a digital representation of a halftone image for one or more pixels that match entries of an array, each entry specifying a number of dots of ink to be output to print a corresponding pixel, each entry comprising a plurality of replacement color values to replace corresponding color values of the corresponding pixel to reduce ink usage when printing the corresponding pixel; and
   replacing each pixel of the one or more pixels in the digital representation of the image with the corresponding pixel of the matching entry within the array having the replacement color values to reduce ink usage when printing the corresponding pixel.

2. The method of claim 1, wherein each of the plurality of pixels is represented by a Neugebauer Primary.

3. The method of claim 1, wherein, for each entry, the number of dots of ink specified by the entry comprises at least two dots of black ink and at least one additional dot of ink, and wherein the replacement color values correspond to printing the corresponding pixel of the entry with only dots of black ink.

4. The method of claim 1, wherein for each entry, the replacement color values correspond to printing the corresponding pixel of the entry using only two dots of black ink.

5. The method of claim 1, wherein for each entry, the replacement color values correspond to printing the corresponding pixel of the entry using at least two dots of black ink and no dots of ink of another color.

6. The method of claim 1, further comprising printing the digital representation of the image after replacing each pixel of the one or more pixels with the corresponding pixel of the matching entry within the array.

7. Apparatus for processing a halftone image comprising:
an image filter arranged to access the halftone image and generate a replacement halftone image,
the image filter being arranged to:
identify pixels in the halftone image that match entries of an array, each entry specifying a number of dots of ink to be output to print a corresponding pixel, each entry comprising a plurality of replacement color values to replace corresponding color values of the corresponding pixel to reduce ink usage when printing the corresponding pixel and
replace each pixel of the one or more pixels in the digital representation of the image with the corresponding pixel of the matching entry within the array having the replacement color values to reduce ink usage when printing the corresponding pixel.

8. The apparatus of claim 7, wherein for each entry, the number of dots of ink specified by the entry comprises at least two dots of black ink and at least one additional dot of ink, and wherein the replacement color values correspond to printing the corresponding pixel of the entry with only dots of black ink.

9. The apparatus of claim 7, wherein for each entry, the replacement color values correspond to printing the corresponding pixel of the entry using only two dots of black ink.

10. A non-transitory computer-readable storage medium comprising a set of computer-readable instructions stored thereon, which, when executed by a processing system, cause the processing system to:
determine whether a pixel of a plurality of pixels of a digital representation of an image corresponds to a printing device having to deposit at least two units of a black print material and at least one additional unit of non-black print material; and
responsive to a positive determination, replace the pixel with a replacement pixel corresponding the printing device having to deposit only units of black print material.

11. The medium of claim 10, wherein the instructions cause the processing system to:
output a replacement digital representation of the image with the replacement pixel.

12. The medium of claim 11, wherein the instructions cause the processing system to:
responsive to a negative determination, not replace the pixel with any replacement pixel.

13. The medium of claim 10, wherein the instructions cause the processing system to output the replacement pixel by overwriting the pixel in the digital representation of the image.

14. The medium of claim 10, wherein the instructions cause the processing system to:
output the replacement pixel by setting color values other than black to zero.

* * * * *

UNITED STATES PATENT AND TRADEMARK OFFICE
CERTIFICATE OF CORRECTION

PATENT NO. : 10,200,568 B2
APPLICATION NO. : 15/521842
DATED : February 5, 2019
INVENTOR(S) : Michel Georges Encrenaz et al.

It is certified that error appears in the above-identified patent and that said Letters Patent is hereby corrected as shown below:

On the Title Page

In Column 1, item (72), Inventors, Line 2, delete "San Cugat del Valles" and insert -- Sant Cugat del Valles --, therefor.

Signed and Sealed this
Twenty-eighth Day of May, 2019

Andrei Iancu
*Director of the United States Patent and Trademark Office*